United States Patent [19]

Vereen

[11] Patent Number: 4,509,123
[45] Date of Patent: Apr. 2, 1985

[54] AUTOMATED TRACKING PROCESS FOR MANUFACTURING AND INVENTORY

[76] Inventor: William J. Vereen, Dogwood Cir., Moultrie, Ga. 31768

[21] Appl. No.: 429,178

[22] Filed: Jan. 6, 1983

[51] Int. Cl.³ .............................................. G06F 15/20
[52] U.S. Cl. .................................... 364/300; 364/403
[58] Field of Search ................ 364/200, 300, 403, 900

[56] References Cited

U.S. PATENT DOCUMENTS

4,459,663  7/1984  Dye ..................................... 364/200

Primary Examiner—Raulfe B. Zache
Attorney, Agent, or Firm—Gipple & Hale

[57] ABSTRACT

An automated tracking process for items of manufacture and inventory, in which each item and each grouping or location of items is labeled with a unique nonvolatile machine-readable code identifying a corresponding data record maintained in a programmable digital computer. A plurality of label reading devices are utilized to report the passage or association of items to the computer, either directly in realtime or via delayed batch entry from offline storage. When an order is received, data records are reviewed to identify items with characteristics demanded by the order, containers holding items selected during the search are identified by label and location for retrieval to an area where individual items are picked from the container. Loading, retrieval and item picking may be cross-checked by computer comparison of the employee action actually taken against the action desired, and employee efficiency may be measured by recording as data records both correct and incorrect actions taken.

13 Claims, 6 Drawing Figures

AUTOMATED TRACKING PROCESS FOR MANUFACTURING AND INVENTORY

BACKGROUND OF THE INVENTION

This invention relates to inventory control systems for manufactured goods, and more specifically, to a system for recording, updating and reporting the manufacture and inventory locations and characteristics of individual garments.

The manufacturing and warehousing of garments has long been conducted according to fairly standard procedures in the United States. An assembly line is normally utilized including a number of work stations at which one of a number of operations, such as cutting, stitching, or attachment of buttons may take place. A unit of work referred to as a "bundle" is passed along the assembly line among the stations. Each bundle enters the assembly line containing cloth cut to serve as the basis for a number of like items, such as shirts. At the end of the assembly line, the items within the bundle are substantially finished.

Also at the beginning of the assembly line, a series of detachable incentive coupons are attached to the bundle. As work is completed on a bundle at a work station, the worker detaches a coupon which is later given to a supervisor for purposes of pay and bonus calculation by hand. The coupon identifies the bundle from which it was removed, and there is maintained an independent record of the number, content, or identity of bundles processed in any given work shift. Due to data volume, it is currently not possible to correlate mistakes made in a series of garments to a common bundle and a worker who performed a particular type of work. It is also extremely difficult currently to control pilferage at the assembly line, as well as to prevent a worker from stockpiling and withholding coupons in a given shift in order to hand them in during a subsequent shift, thus producing the illusion of steady work output.

In the uniform industry, garments are often placed in inventory for a significant period of time following manufacture, because a purchaser's long-term commitment to a uniform design does not incorporate the planned obsolescence of everyday clothing fashion. A group of like items of differing sizes may be placed in inventory until an order arrives for such items of that particular design. Typically, the order involves some further customization of the items including, for instance, insignia indicating the identity of the organization, the job title, or rank, or name of the wearer, or trademark or promotional slogan. Because of the normal difficulties of communication between the manufacturer and the purchaser as well as the employee for whom the garment is destined, such items are occasionally applied to a garment of the wrong size, color, or style, or may be applied in the wrong position or with the wrong name or indicia. In the past, the garment returned for erroneous customization has been de-customized, but removal of customizing items can not be accomplished without some damage to the garment due to stitching. Thus, the reuse of a de-customized garment depends on receipt of an order for the same style of garment with customized items of equal or greater size which may be placed to cover the stitching marks. The recordkeeping costs of maintaining de-customized garments in stock has, in the past, prohibited systematic reuse on a commercial scale.

Warehousing has, in the past, been conducted by placing a plurality of like garment items into a box, which is then marked with its contents and stored in a warehouse bin together with other boxes. Boxes having like contents are typically stored together, and each bin designated as containing a certain style, in order to facilitate relocation of stored items. This does not make the most efficient use of warehouse bins, because the initial location for each box is selected on the basis of the need for relocation rather than on the basis of efficient use of bin space, transport vehicles, and personnel. Also, the contents of each box has not been monitored in the past, thus permitting pilferage with relative ease.

ANALYSIS OF PRIOR ART

U.S. Pat. No. 3,593,008 discloses a computer system for recording the numbers of items produced and the numbers of hours worked in a manufacturing facility. The system counts production units and presumes them to be identical, without recording the individual characteristics of each unit. Similiarly, this system counts only the total number of workers on-line at a given time, and does not identify an individual worker with a particular operation performed on a particular garment or other unit. Moreover, the system relies on the production line supervisor to count the number of persons entering and leaving the production line during production. Thus the accuracy of data depends on the accuracy of the supervisor. Finally, with regard to inventory control, this system provides only a count of the total number of items in inventory, without dating individual items for purposes of a first-in, first-out inventory control system.

U.S. Pat. No. 3,688,087 discloses an inventory control system utilizing a product identifier optical code such as the uniform products code. The system is adapted to rapid turnover inventory situations such as a supermarket, and does not track individually customized items, because the coded label does not differentiate between individual items. Furthermore, since items are stored in predetermined shelf locations among like items in order to facilitate ease of location by shoppers, there is no provision for a random access storage assignment system.

U.S. Pat. No. 3,784,802 discloses an inventory system which is applied to a retail garments outlet by examples starting in column 8, line 27. This system also records merely the number of garments of a particular type in inventory, and records neither their location nor the date on which they entered inventory. Users of this system would therefore be limited to storage of all like garments in a predesignated area, and use of a physical stack to implement a first-in, first-out or other queuing procedure.

U.S. Pat. No. 3,639,728 discloses a conveyorized routing system for luggage or similar items. The system includes an optical character reader which scans character labels placed on luggage, and logic circuitry which controls a switch yard conveyor to direct the luggage to its destination.

SUMMARY OF THE INVENTION

The present invention comprises a manufacturing and inventory record system, implemented with the aid of programmable digital computer, for standard and customized items of manufacture such as garments. Each unit of work or inventory utilized during the process is labeled with a unique machine-readable code, which serves as a key for location of a computerized data record describing the item. At various stages of the process, a unit must be relocated by human effort, which requires that the item additionally be labeled with a human-readable code. This code may be the same as the machine-readable code through use of a font such as OCR-A. Devices for generation of these labels, and both fixed and portable font-reading devices for computer input, are now well-known and commercially available. A label may be applied to garment, bundle, box, or bin in a temporary or permanent fashion.

At the beginning of manufacture, each garment is labeled with a serial number unique to that garment, and the bundle of garment cuts is labeled with a unique serial number of that bundle. Thus, the label for each bundle can be read into the recordkeeping computer through input devices at each work station, or incentive coupons bearing the label can be detached for later input to the computer. The record for each bundle and each garment reflect their association through the manufacturing process, and can include the identity of each person performing work on the bundle. The time of beginning and end of assembly for each bundle can also be recorded, to cross check for prevention of time shifting abuse by coupon stockpiling as described above.

At the end of assembly, like garments are grouped into a box for warehousing. The box is also labeled with a unique serial number, and the data record of each box and garment is amended to reflect their association. The computer may be utilized at the box-filling point to determine the characteristics of each garment by reference to their date records, followed by a comparison of the garment characteristics to the intended content characteristics for the box and, if necessary, rejection of the garment. Following filling, the weight of the box can be entered into the computer for comparison of the actual weight to the weight expected due to the known contents of the box. Any discrepancy outside a predetermined tolerance can cause the box to be held for inspection. Acceptable boxes are then forwarded to the inventory warehouse.

In the warehouse, the box may be stored in a bin selected by computer or personnel. Each bin is also labeled with a unique serial number. At the storage point, the box number and bin number are entered into the recordkeeping computer, and the associated data records of the box, bin, and garments therein may be updated to reflect the location and contents. When an order is received for garments of a given style and size, the data records may be searched to identify appropriate garments and their box and bin location. This selection is preferably implemented on a first-in, first-out basis to minimize the age of inventory. Employee identification may also be entered at the time a box is stored or retrieved from a bin in order to calculate incentive pay and bonuses. Additionally, at the time of box retrieval, the box number may be entered for purposes of confirmation that the box retrieved is indeed the one sought.

The retrieval order for each box also includes the destination of the box, referred to as a picking area. When the box arrives in the picking area, its number is again entered both to indicate relocation of the box in its data record and to confirm that it has arrived at the correct picking area. A uniquely-numbered picking order for individual garments is delivered to an employee in the picking area, and indicate the box in which each garment can be found. The employee enters the picking order number and the label of each garment actually picked, in order to confirm that the garment actually picked is the garment sought. The inventory stock volume and picking area stock volume are also computed utilizing this information in order to maintain an adequate stock at both areas. Again, the employee identification may also be entered for determination of payroll and bonus.

The picked garments are then forwarded to a customization station, where a customization order is provided to an employee. At completion of customization, an inspection is conducted by comparing the actual garments against the garments ordered and customization desired. The accuracy and efficiency of this stage can likewise be confirmed by entry of employee identification. This reduces the number of garments returned for erroneous customization.

These and other objects and advantages of the present invention will become more readily apparent by reference to the following detailed description thereof, when read in conjunction with the accompanying drawings.

DETAILED DESCRIPTION OF THE DRAWINGS

The best mode and preferred embodiment of the present inventive process is illustrated in FIGS. 1 through 7. In the figures, transfer of process control from one step in a first figure to a subsequent step in another figure is illustrated by placement of the number of the subsequent step in a circle.

The process is conducted with the aid of any well-known programmable digital computer which has been configured to record, update and report a plurality of data records. Each record corresponds to a single element of the process, such as garment, bundle, box, bin, picking area, order or individual employee.

Figure 1:
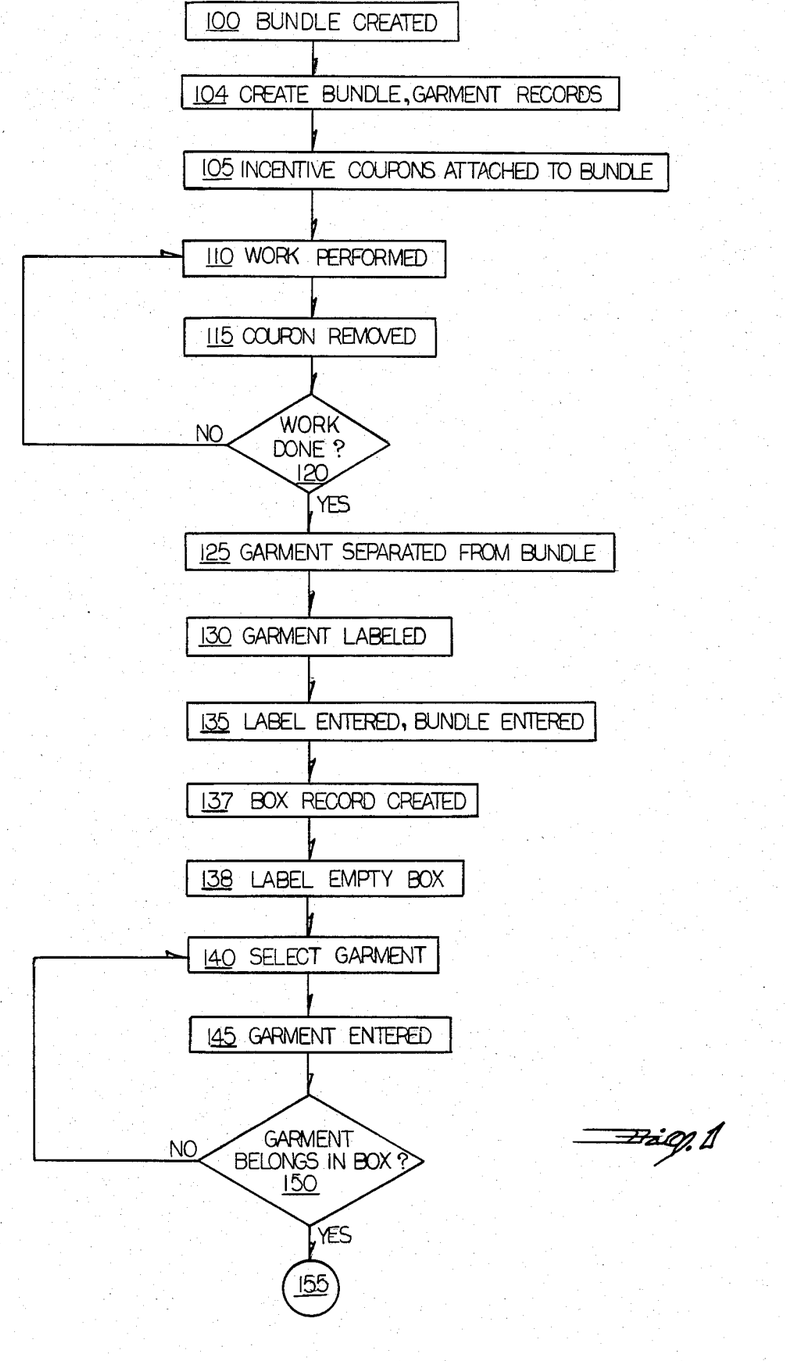
FIG. 1 is a flowchart diagram of an initial portion of the present inventive process.

The present inventive process begins at step 100 illustrated in FIG. 1 during which a bundle is created for entry into an assembly line. Each bundle incorporates a number of substantially identical garment cuts from which garments are manufactured during passage through the assembly line. At step 104, a record for each bundle and garment is created, and initialized to reflect the association of the bundle with the garment cuts therein. At step 105, a plurality of detachable incentive coupons are attached to the bundle for removal upon completion of work at each work station in the assembly line.

It should be understood that the labels referred to throughout this specification include nonvolatile machine-readable media and a serial number expressed therein unique to the item labeled. Technologies available off-the-shelf for this purpose at present include barcode fonts, such as the uniform products code, and character fonts, such as OCR-A. A label utilizing such a font may be recognized and converted to data for entry into the recordkeeping computer through a table-top reader across which the label is moved, or through a hand held "wand" which is moved across the label. In the present inventive process, the reader mechanisms may be coupled directly to the computer for realtime entry or, alternatively, to remote offline storage for delayed batch data entry.

As the bundle passes through an assembly line, it encounters a number of work stations at which specific garment assembly tasks 110 are performed on the garment cuts within the bundle. Step 110 may include attaching a unique machine-readable label to each garment cut. After each task is performed at step 110 on a bundle, a coupon is removed at step 115 from the bundle. At step 120, if assembly on the bundle has not been completed, control is transferred to step 110. If work has been completed, then control passes to step 125 at which assembled garments are separated from the bundle. Following steps 125, optional step 135 may be conducted or omitted in which the bundle and the garments separated therefrom are entered and compared to their data records in order to determine whether any garments have been removed or misbundled without authorization.

The garments are now available for placement in boxes for warehouse storage. At step 137, a box data record is created and at step 138, an empty box is labeled with the serial number corresponding to the record created. The record creation of step 137 may include an initial determination to the type of garment to be stored within the box.

At step 140, a garment is selected from those unbundled, and is entered at step 145. The garment record and box record are compared and, if the garment does not belong in the box, step 150 transfers control to step 140 where another garment is selected. If the garment selected and entered does belong in the box, control is transferred by step 150 to step 155 illustrated in FIG. 2 where the garment is placed in the box, and if the box in not yet full, step 160 transfers control to step 140 where the process of selection and placement are repeated until the box is full, step 160 transfers control to step 165 where the data records of the garments placed in the box are interrogated to compute the weight of the box. The actual weight of the box is then entered at step 170. If there is a discrepancy between the actual weight of the box and the computed weight, step 175 transfers control to step 177 which may include any error procedures such as manual inspection. If there is no discrepancy, step 175 transfers control to step 180 at which a warehousing order is produced for the box. The box containing the labeled garments is then transferred to the warehouse at step 185.

Figure 2:
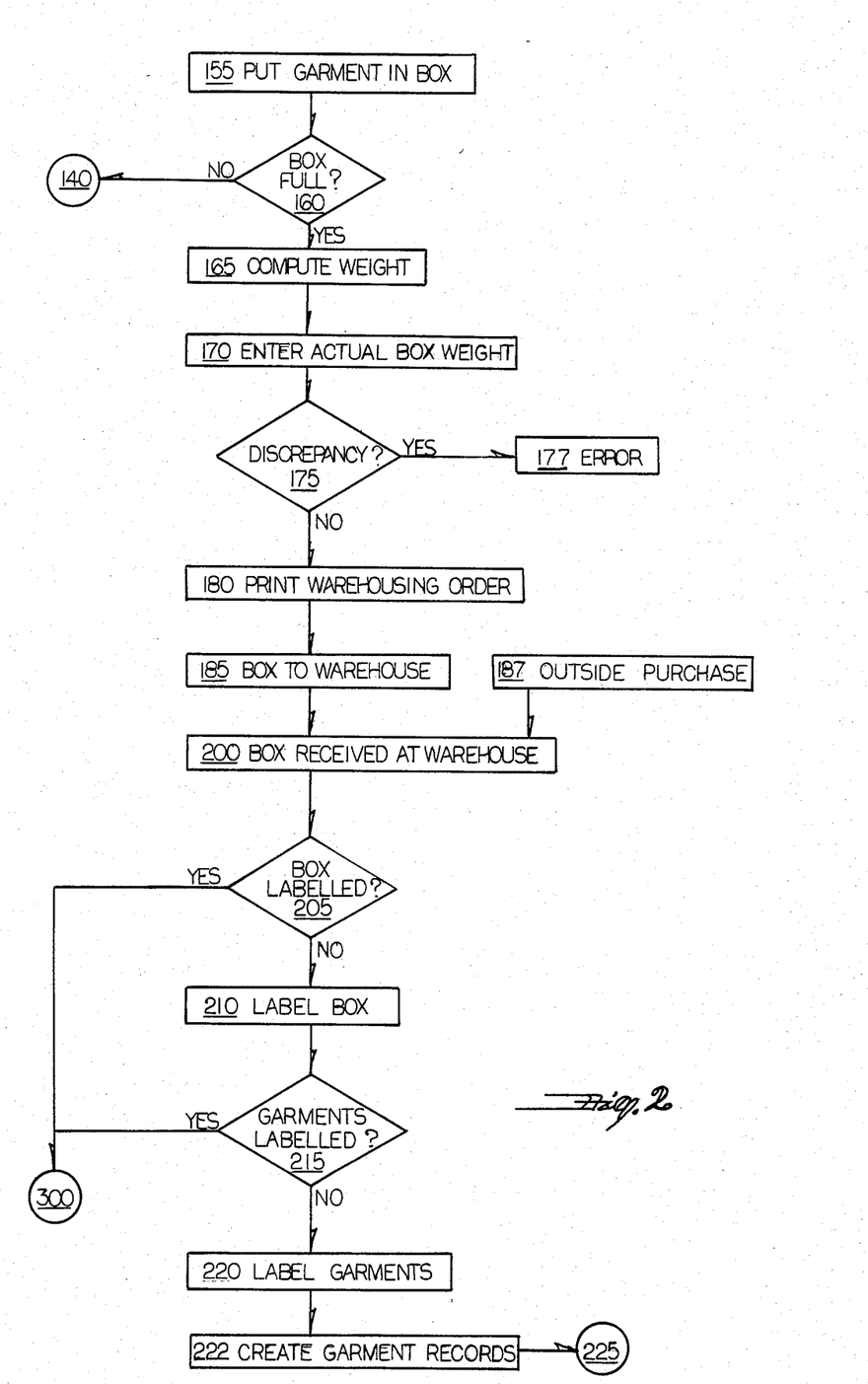
FIG. 2 is a flowchart diagram of a second portion of the present inventive process.

At warehouse receiving, boxes are received at step 200 both from the assembly line and from outside purchases indicated at step 187. At step 205, if the box is not labeled then control is transferred to step 210 at which the box is labeled and a box record is created. Since such a box received in an unlabeled condition is by definition from an outside purchase, the garments in the box are then labeled at step 220 and garment records created at step 220. Control then passes to step 225. On the other hand, if the box received at the warehouse is labeled by the assembly process, then step 205 transfers control directly to step 225.

Figure 3:
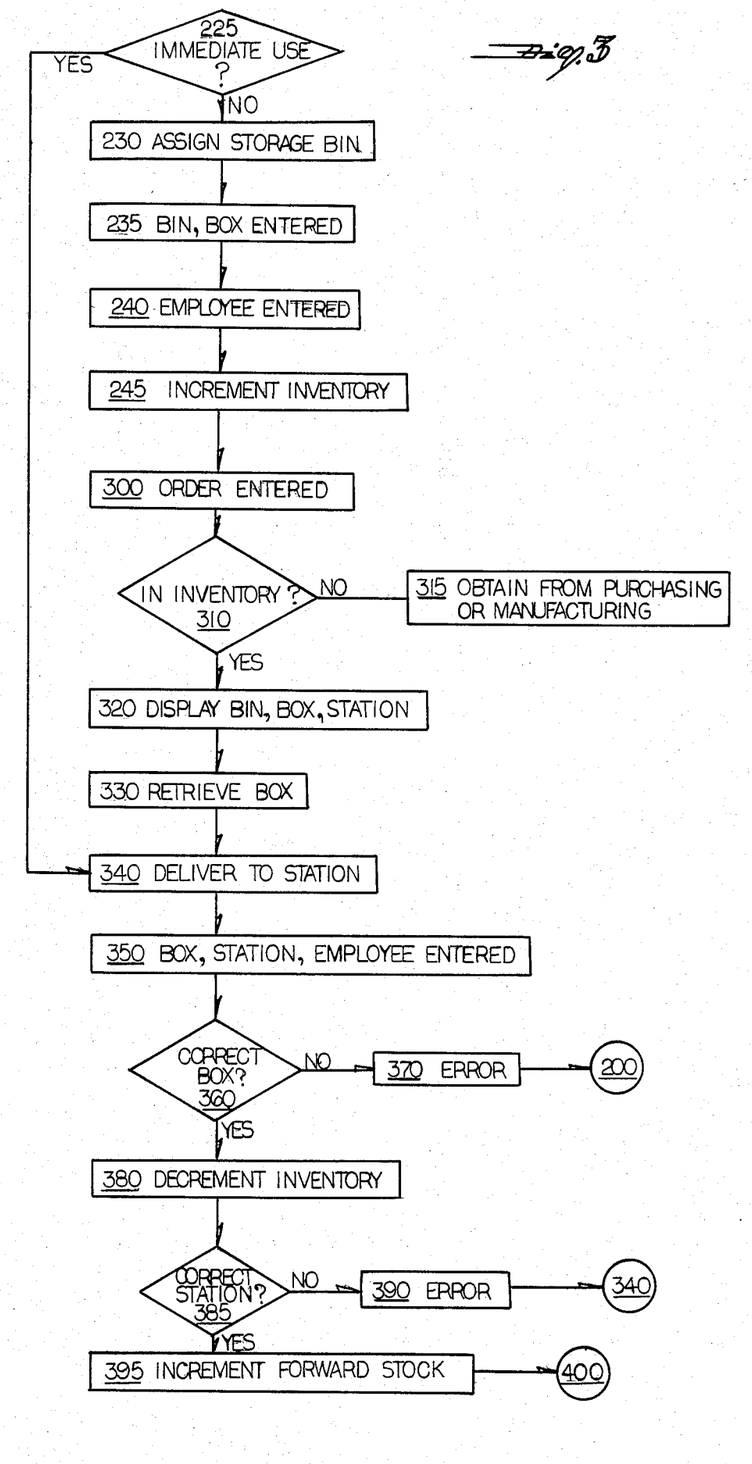
FIG. 3 is a flowchart diagram of a third portion of the present inventive process.

Turning to FIG. 3, at step 225, if there is no demand for immediate use of the garments in the box, then control is transferred to step 230 at which a storage bin is assigned for the box. The box is then moved to the bin at step 232 and the bin and box entered at step 235. As an optional step, the bin and box data records are compared and, if the box does not belong in the bin located, then control is transferred to step 232 where the box is again moved to the correct bin. This may be omitted if random bin assignments are utilized. In that case, or in case the correct bin is located, control passes to step 240 where the employee identity is entered to record the fact of work completed. At step 245, the inventory of garments in the warehouse is incremented to reflect the addition to garments within the box just stored.

When an order for garments is received, the order is entered at step 300, usually by means of a well-known input device such as a keyboard. The requirements of the order are then compared to the garment records and, if appropriate garments are not in inventory, step 310 passes control to step 315 at which the garments ordered are obtained from purchasing or manufacturing. On the other hand, if the garments are in inventory, step 310 passes control to step 320 at which a box is identified for retrieval based on the correspondence of its contents to the order requirements. The data record of the box also indicates the bin in which the box is stored. A destination for the box, one of a number of picking stations, is also designated at this time. At step 330, the box is then retrieved from the bin and, at step 340 delivered to the picking station. It is to step 340 that control is transferred from step 225 in the event that garments in a box arriving from manufacturing or purchasing have an immediate use.

At step 350, the box, station, and identification of the delivering employee are entered, both for payroll and incentive purposes and to determine if the box has been correctly delivered. At step 360, if the box has not been delivered to a correct station, control is transferred to step 370 where an error procedure is conducted. This error procedure might typically include returning the box to warehouse receiving for placement in a bin, through reversion to step 200. If the correct box has been delivered, then step 360 transfers control to step 380 where the inventory record is decremented accordingly. If the box has been delivered to an incorrect picking station, then step 385 transfers control to an error procedure at step 390 which might typically include redelivery of the box through reversion to step 340. If the box has been delivered to the correct station, then step 385 transfers control to step 395 at which the record of stock located at picking stations, known as "forward stock", is incremented accordingly.

Figure 4:
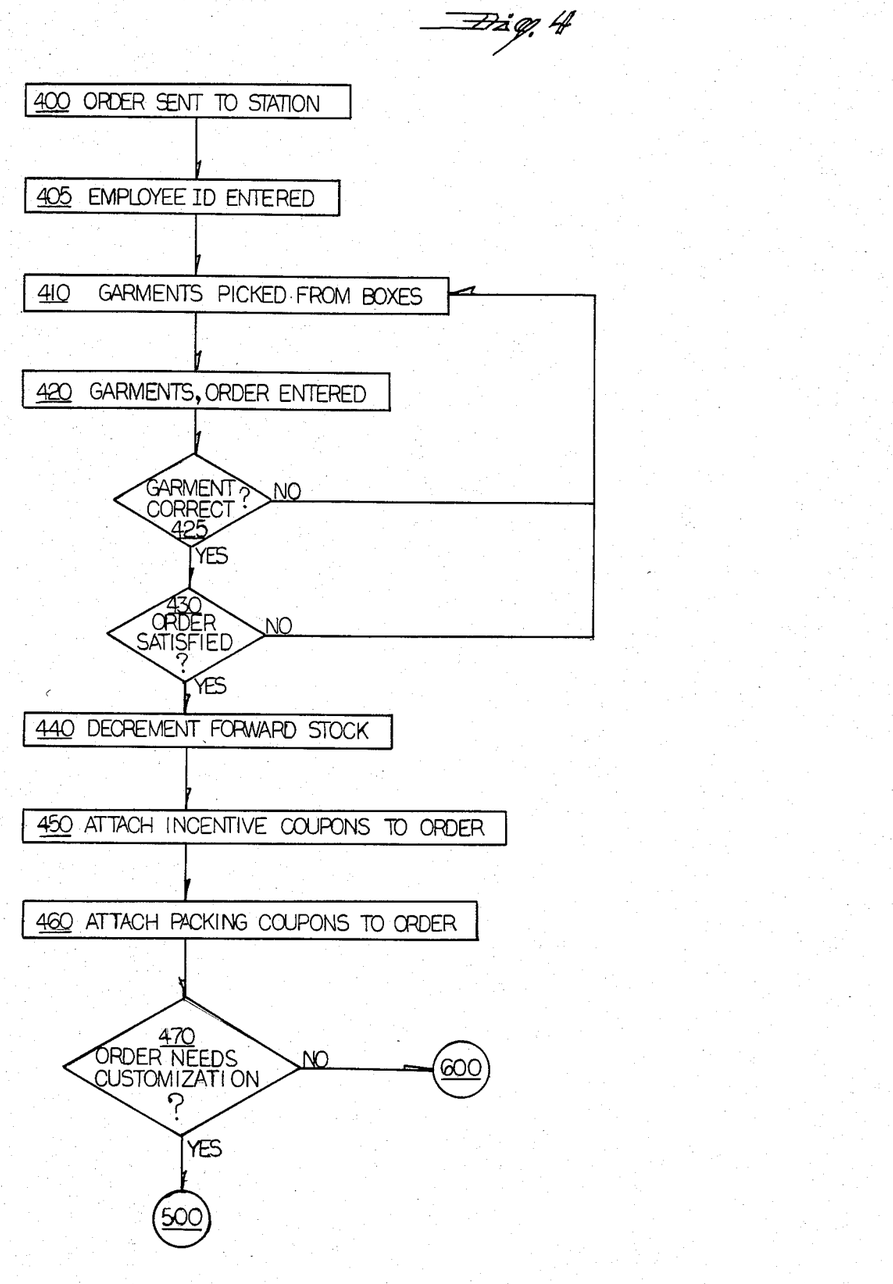
FIG. 4 is a flowchart diagram of a fourth portion of the present inventive process.

Turning now to FIG. 4, a picking order document is then delivered to an employee. This document instructs the employee to select garments of certain types, styles and sizes to satisfy a customer order. The document also includes a machine-readable code expressing an order number associated with the order which identifies a data record in which the details of the order appear.

At step 405, the identity of the employee receiving the picking order at the picking station is entered. At step 410, the employee selects garments filling the order from boxes at the picking stations. At step 410, the garments in the order are entered and the desired characteristics of the order are compared with the actual characteristics of the garments selected at step 425. If any of the garments selected are not satisfactory, control is transferred to step 410 where other garments are picked. If the garments selected so far are satisfactory, step 425 transfers control to step 430, and if the order is then satisfied, step 430 transfers control to step 440. If the order is not year satisfied, step 430 returns control to step 410 for further selection of garments from boxes.

At step 440, the record of forward stock is decremented to reflect removal of garments associated with the order from the picking station. At step 450, incentive coupons are attached to the order. These are used much as the assembly line incentive coupons, to record the efforts of employees conducting customization procedures to be detailed below. At step 460, packing lists are generated and attached to the order. Each list provides a breakdown of garment requirements for one individual among those included in the order, together with customization details if any. At step 470, if the order requires customization, control is transferred to step 500. If no customization is required, control is transferred to step 600.

Figure 5:
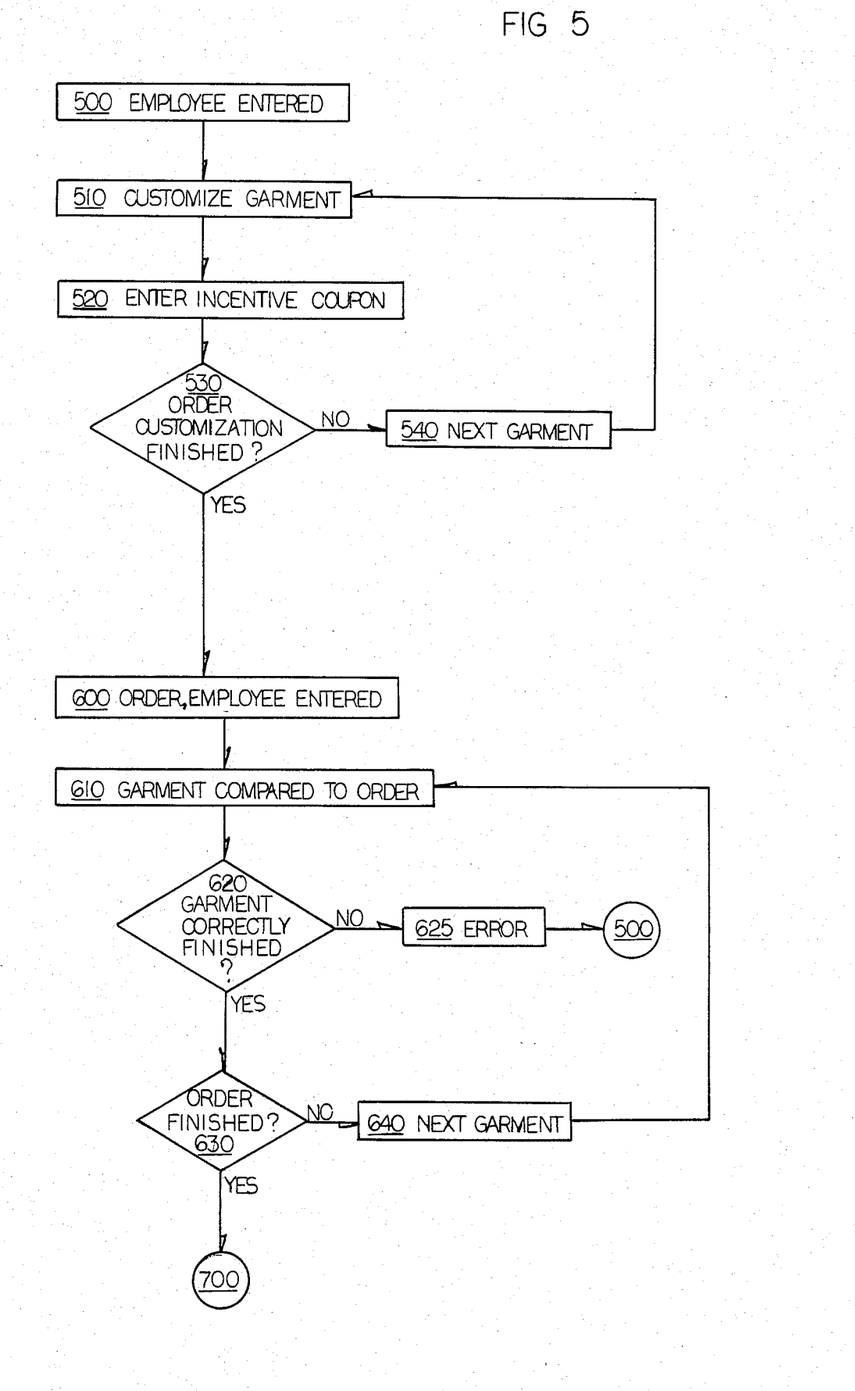
FIG. 5 is a flowchart diagram of a fifth portion of the present inventive process.

Turning to FIG. 5, at step 500 the identification of the employee conducting customization procedures is entered, and a garment is customized according to the requirements of the individual packing list including the garment at step 510. At step 520, the incentive coupon corresponding to the particular operation performed is removed by the employee from the order and may be entered immediately or later. If order customization has been completed, step 530 transfers control to step 600. Otherwise, step 530 transfers control to step 540 where the next garment is selected and control is again transferred to step 510. It should be noted that efficient division of labor may be advantageously achieved by dividing the total customization effort into a series of individual work stations, similiar in form to an assembly line. Thus step 500 through 540 would be performed repetitively at each work station in the customization line.

Step 600 begins an inspection sub-procedure. At step 600, the employee identification of the inspector, and the order, are entered. Order details are then reviewed for each garment, and the garment is visually compared to the order details by the inspector at step 610. If the garment has been finished correctly, then step 620 transfers control to step 630. On the otherhand, a garment finished incorrectly causes transfer of control by step 620 to step 625 where an error procedure is instituted. This error procedure may include, for instance, transfer of the garment back to the customization station and step 500. At step 630, if the order is not yet finished, control is transferred to step 640 where another garment included in the order is selected, and again compared to the order at step 610. If the order is completed, step 630 transfers control to step 700.

Figure 6:
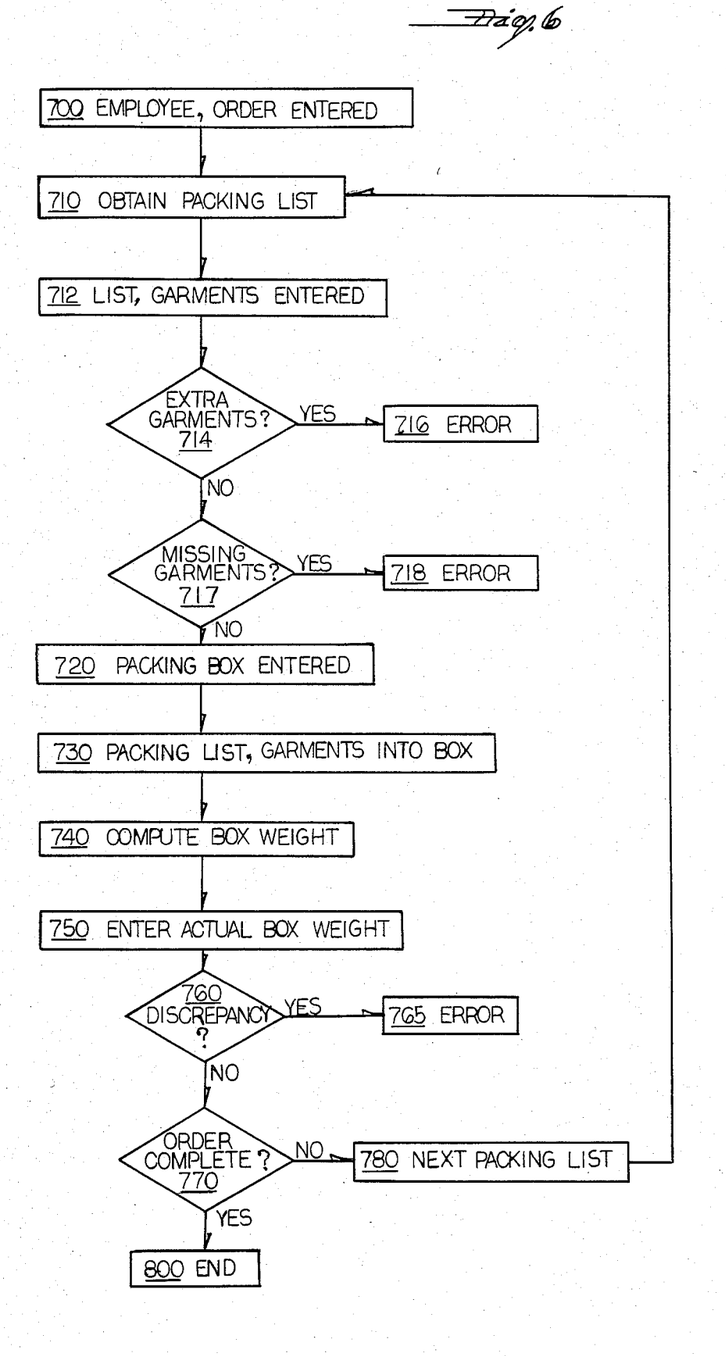
FIG. 6 is a flowchart diagram of a sixth portion of the present inventive process.

Turning now to FIG. 6, a final preparation sub-procedure is illustrated. At step 700, the identity of the order being processed and the employee conducting the procedure are entered, and at step 710, the employee obtains one or more packing lists for the order, each of which bears a unique code and corresponds to a data record. The order may advantageously be broken down into lists of garments corresponding to the ultimate users thereof. Thus, if the order includes such information, each list may identify the individual and the garments destined for that individual. At step 712, a packing list and the garments satisfying that list are entered. At step 714, the data record for the entered list is compared to the records for the entered garments and, if extra garments are present, control transfers to step 716 where an error procedure is implemented. This procedure may include removal of the extra garments to their proper locations. If no extra garments are present, step 714 transfers control to step 717 where the data records are again compared to insure that the list is satisfied completely. If garments are missing, control transfers to step 718 where another error procedure is implemented, which may include additional selection of garments from among those customized for the order, location of misplaced garments or requesting replacements from inventory. If no garments are missing, step 717 transfers control to step 720. At step 720, a packing box is selected, also labeled with a unique machine-readable code and entered. The packing box also corresponds to a data record, which is updated to indicate the placement of garments and packing list into the box at step 730. At step 740, the expected weight of the box is computed by reference to the characteristics of the garments therein as recorded in the data records. The packing box is then weighed and its weight entered at step 750 and, if there is a discrepancy with the computed weight, at step 760 control is transferred to step 765 where an error procedure is implemented which may include manual inspection of the box. If there is no discrepancy at step 760, control is transferred to step 770. If the order is not yet complete, step 770 transfers control to step 780 where another packing list is selected, and control then reverts to step 720. If the order is complete at step 770, then an end procedure is implemented at step 800 which maay include shipment of the packing boxes.

Thus, it can be appreciated that the present inventive process provides rapid and accurate entry, reporting and retrieval of inventory. The process enables identification of work performed by specific employees, both to identify the source of errors and to reward efficient performance. Another benefit of the present inventive process is improved theft control. Since each garment will be uniquely identified, the garment label can be utilized to conclusively determine the appropriate location of the garment, in contrast to prior art where theft could be proven only by observation of the act.

It should be apparent although there has been described what is presently considered to be a presently preferred form of the invention in accordance with the Patent Statutes, changes may be made in the disclosed process without departing from the true spirit and scope of this invention as expressed in the following claims. For instance, the order in which the steps may be conducted are interchangeable. Moreover, the process is not limited by its application to garments, and may be used with any items of manufacture and inventory. It is therefore intended that the appended claims shall cover such modification and applications that may not depart from the true scope and spirit of the present invention.

What is claimed is:

1. A process for storage and retrieval of items in inventory with the aid of a programable digital computer and a plurality of reading means adapted to read labels and communicate said label to said computer, comprising the steps of:
(a) establishing within said computer a plurality of data records, each said data record being identifiable with and adapted to record the characteristics, location and contents of labeled elements;
(b) selecting a plurality of items of like characteristics, each said item bearing a machine-readable identification code label unique to the item bearing said label, and identifying one said data record corresponding to the item bearing sad label;

(c) selecting a common container, said container bearing a machine-readable identification code label unique to said container, and identifying one said data record corresponding to the container bearing said label;

(d) reading said labels of said plurality of items of like characteristics and of said container by use of one said reading means, and updating said data records of said container and said items to indicate the location of said items inside said container;

(e) selecting an inventory storage space in which to store said container from among a plurality of inventory storage spaces, each said space bearing a machine-readable identification code label unique to the space and having a data record corresponding to said space, reading said labels of said selected space and said container by use of one of said reading means, and updating said data records of said container and said space to indicate the location of said container inside said space;

(f) receiving an order for items, identifying one said data record corresponding to said order, recording said order in said data record corresponding to said order, comparing said order with said data records for said items stored in said spaces, and identifying selected items in said inventory storage spaces having characteristics corresponding to characteristics demanded by said order;

(g) identifying of each said space and each said container in which each said selected item is located;

(h) retrieving each said identified container to a predetermined picking area, each said picking area having one said reading means associated therewith and a data record within said computer corresponding thereto;

(i) entering said label of each said selected container by use of said reading means associated with said predetermined picking area, and updating said data records of each said inventory storage spaces, said selected container and said picking area to indicate the location of each said selected container in said picking area; and (j) retrieving said selected items from each said selected container, reading said labels of said order and each said selected items by use of said reading means, and updating said data records of said order and each said selected items to indicate the retrieval of said selected items for said order.

2. The process of claim 1 additionally including a step following step (d) wherein said container is weighed by weighing means coupled to said computer, said weight of said container is compared to characteristics of said container and said items within said container as recorded in said data records of said container and said items and, if said weight and said known characteristics differ, then implementing an error-checking procedures.

3. A process as claimed in claim 1 wherein step (i) additionally includes the step of comparing each said container read by said reading means at said picking area with said containers identified in step (g) and, if a specific container does not correspond to any said containers identified in step g, then implementing an error procedure.

4. A process as claimed in claim 3 wherein said error procedure includes reversion to step (e).

5. A process as claimed in claim 1 wherein identification of containers in step (g) is conducted on a first in, first out basis.

6. A process as claimed in claim 1 wherein step a includes data records established within said computer adapted to record the work record of employees, each said employee bearing a unique machine-readable identification code label, and identifying a data record within said computer corresponding to each employee; and wherein step e includes selection of an inventory storage space by an employee, reading said employee label by said reading means, and updating said corresponding employee data record to indicate the storage of said container in said selected storage space.

7. A process as claimed in claim 6 wherein step (h) includes retrieval of each said container by an employee, and including a step after step (i) wherein said employee label of said employee is read by said reading means, and said data record corresponding to said employee is updated to indicate completion of retrieval of said container.

8. A process as claimed in claim 1 wherein step (j) additionally includes comparing said data records corresponding to each said selected item to said data record corresponding to said order and, if said characteristics of said item do not match those remaining to be satisfied for said order, then reverting to step (i).

9. A process of manufacture and inventory for garments conducted with the aid of a programable digital computer containing a plurality of data records adapted to record the characteristics, location, and contents of containers, inventory, storage spaces, garments, bundles, and picking areas, and work completed by employees, and with the aid of a plurality of reading means, each said reading means adapted to read a label and communicate said label to said computer, comprising steps of:

(a) creating a bundle comprising a plurality of garment cuts, said bundle and each said garment cut bearing a unique identification code label, identifying data records corresponding to said bundle and each said garment, attaching a plurality of detachable identification code coupons to said bundle, and updating said data records of said bundle and each said garment cut to indicate the location of each said garment cut in said bundle;

(b) passing said bundle through a sequential assembly path wherein work is conducted on said garments of said bundle by a plurality of employees, each said worker removing one said coupon, said coupon and said worker being identified by one said reading means to said computer, and updating said data records of said bundle and said worker to indicate work performed;

(c) repetition of step (b) until said garment cuts are made into completed garments;

(d) selecting a container bearing a unique identification code label and corresponding to one said data record, selecting a plurality of completed garments of like characteristics for placement in said container, reading said label of said box and said labels of each said selected garment with one said reading means, comparing said data record of said container and said data record of each said garment within said computer to insure that garments of predetermined similar characteristics are placed in said container, and rejecting any said selected garment which does not meet said predetermined characteristics;

(e) packing said container with said selected garments which meet said predetermined characteristics, updating said data records of said container and said contained garments to indicate the location of said contained garments inside said container, and computation of the expected weight of said container by reference to the characteristics of said contained garments in said data records of said computer;

(f) weighing said container, communicating the weight of said container to said computer, comparision of the weight of said container with the expected weight of said container based on the data records of said garments within said container and, if said weights differ, executing an error procedure;

(g) receiving an order for garments, assigning a data record to said order, said data record containing garment characteristics demanded by said order, and assigning a label to said order;

(h) comparing said data record for said order with said data records for said garments, identifying selected garments having characteristics corresponding to characteristics demanded by said order, and identifying selected containers in which said selected garments are contained;

(i) retrieving each said selected container to a predetermined picking area, reading said label of each said selected container by said reading means, and updating said data record for each said selected container and said picking area to indicate the location of each said container in said picking area;

(j) retrieving said selected garments from each said container, reading said label of each said selected garment by said reading means, and updating said data records of each said selected garment to indicate the location of each said selected garment in said picking area; and (i) packing said selected garments together with said order for shipment.

10. A process as claimed in claim 9 including the additional steps after step e of placing said container in an inventory storage space bearing a label and corresponding to one said data record, reading said label of said storage space and said container with said reading means, and updating said data records of said container and space to indicate the location of said container within said space; and after step (h), the step of identifying each said space in which each said selected container is located.

11. A process as claimed in claim 9 including the step after step (j) of attaching a plurality of detachable identification coupons to each said garment; customizing each said garment to meet requirements of said order; detaching one said detachable coupon from each said customized garment; reading said detached coupon by use of said reading means; and updating each said data record of each said customized garment to indicate customization thereof.

12. A process as claimed in claim 9 including the step after step (j) of obtaining at least one packing list corresponding to a portion of said order; selecting garments listed on said packing list; selecting a packing box bearing a unique machine-readable code label and corresponding to one said data record; reading said label of said packing box by use of said reading means, and updating said data records corresponding to said packing box, said packing list and said listed garments to indicate association thereof; and placing said packing list and said garments into said packing box.

13. A process as claimed in claim 12 including the further step of determining a computed weight of said packing box by reference to said data records corresponding to said packing box and said listed garments, determining an actual weight of said box and entering the actual weight in said computer, and executing an error procedure if said actual weight differs from said computed weight.

* * * * *